United States Patent Office 3,798,184
Patented Mar. 19, 1974

3,798,184
POLYURETHANES STABILIZED BY INCORPORATING THE REACTION PRODUCT OF ACETONE AND DIPHENYLAMINE
Michael Cuscurida and Doris Marvin Rice, Austin, Tex., assignors to Jefferson Chemical Company, Inc., Houston, Tex.
No Drawing. Filed July 5, 1972, Ser. No. 269,153
Int. Cl. C08g 22/44
U.S. Cl. 260—2.5 BB          5 Claims

ABSTRACT OF THE DISCLOSURE

Polyurethane compositions prepared from particular polyether polyols are stabilized against dry-heat degradation by incorporating therein the reaction product of acetone and diphenylamine.

---

Polyurethane compositions are recognized as being susceptible to various forms of degradation. For example, polyurethane foams can exhibit scorch under certain process and storage conditions which can severely diminish the characteristics and appearance of the foams.

Likewise, discoloration or breakdown of the polyurethane product as the result of ultraviolet rays, oxygen, moisture, heat, and the like, can altogether prevent the application of the polyurethane product to its intended purpose. Softening of an elastomeric polyurethane or the development of tackiness in a cured coating are other representative illustrations of degradation of the polyurethane composition.

It is, of course, known that polyether polyols are particularly susceptible, due to their molecular structure, to oxidative degradation.

Oxidative materials present in the polyether polyol, exposure of the polyether polyol to air or heat, and the like, although representative of important causative factors of degradation, are not necessarily the only ones contributive to the various types of decomposition that can occur in a polyurethane product. See for example U.S. Pat. 3,494,880.

Accordingly, even though the polyether polyols that are to be employed in polyurethane production have been stabilized with conventional inhibitors such as disclosed in U.S. Pats. 2,942,033; 3,494,880; 3,567,664 and 3,637,-573, various forms of polyurethane degradation can still occur that can inhibit the effectiveness or applicability of the polyurethane composition.

It is to such a situation that the instant invention is directed.

Accordingly, the applicants have found that the stability of polyurethane compositions to dry heat represented a particularly difficult and intriguing problem. The problem was such that a polyurethane composition showed dry-heat degradation whether or not the polyol that was employed to prepare the polyurethane composition had been suitably stabilized with conventional antioxidants.

The test employed to determine the dry heat stability of the polyurethane composition consisted of placing the particular polyurethane composition to be tested in a forced draft oven for seven days at 215° C. At the end of the test period, the polyurethane composition was examined for signs of degradation. The presence of scorching, tackiness, softening, loss of physical properties, and the like, was typical evidence of degradation. In an extreme case the polyurethane composition can completely lose its integrity and in some instances can spontaneously ignite. It is noteworthy that the addition of even large amounts of conventional oxidation inhibitors, and closely related compounds, at most, retard somewhat the degree of degradation.

We have now surprisingly discovered that such dry-heat degradation of polyurethane compositions can be effectively eliminated by employing in the polyurethane composition a particular stabilizing agent comprising the reaction product, e.g., the condensation product, of acetone and diphenylamine and by using as the predominant polyol for polyurethane formation, a polyether polyol having an average molecular weight per hydroxyl group in the range of 300 to 2,500.

This invention is therefore directed to dry heat stabilized polyurethane compositions that have been prepared from polyether polyols that have an equivalent weight, i.e., an average molecular weight per hydroxyl group in the range of about 300 to 2,500. Included, therefore, in our invention are any stabilized polyurethane compositions that were formed using the acetone diphenylamine condensation product stabilizer, as defined herein, and employed as a polyol component, predominantly the above-defined polyol.

Representative of the stabilized polyurethane compositions of this invention are polyurethane elastomers, polyurethane coatings, polyurethane flexible foams, polyurethane semi-flexible foams, polyurethane integral skin foams, and the like. Said polyurethane foams including either the open or closed cellular foams and including polyurethane compositions prepared by the conventional prepolymer system, quasi-prepolymer system, or the one-shot method.

It is, of course, recognized that depending on the type of polyurethane product desired, and its intended ultimate utility, the need for stabilizing the polyurethane composition against dry-heat degradation will vary somewhat. Nonetheless, our invention is directed to all such heat stabilized compositions. Therefore, although our invention has wide applicability, it will be particularly useful in preventing dry-heat degradation in polyurethane compositions. such as in integral skin, semi-flexible foams where the dry-heat degradation problem can be particularly acute.

It will be appreciated that as long as the limitations as taught herein are followed, the skilled artisan can otherwise prepare the desired polyurethane compositions according to conventional procedures and by employing conventional materials. For example, the skilled artisan can employ the particular isocyanate and polyether polyol that will provide a polyurethane product that is most suitable for the intended use. U.S. Pats. 3,194,773 and 3,072,582 represent exemplary descriptions concerning the choice of isocyanate and polyol and how such choice relates to the production of various forms of polyurethane products. Accordingly, any suitable organic isocyanate containing not less than two isocyanate groups per molecule may be utilized. It is, therefore, within the knowledge of the skilled artisan to formulate the particular polyurethane composition according to the particular properties and utilities desired of the polyurethane composition. Therefore, the choice, if any, of blowing agents, cross-linking agents, catalysts, fillers, fire-retardants, silicone oils, stabilizers or antioxidants additional to the subject stabilizer, and the like, that are conventionally included in polyurethane formulations can also be conventionally employed in the heat stabilized polyurethane compositions of this invention.

As hereinbefore stated, the dry heat polyurethane stabilizing agent of this invention is the condensation product formed by reacting acetone and diphenylamine. Such a condensation product has been heretofore prepared and described. Although the exact composition of the condensate is not to our knowledge known, it is otherwise well recognized.

Typically, the acetone-diphenylamine reaction product is formed by reacting a molar excess of acetone with diphenylamine generally in the presence of a catalyst. Conventional temperatures such as in the range of about 220° to 310° C., and autogenous pressures up to about 1,000 p.s.i.g., and higher, for a time sufficient to effect condensation, such as in the range of about 3 to 24 hours, are suitable. Generally, from about one to three mols of acetone per mol of diphenylamine are employed. Conventional catalysts such as iodine, bromine, hydrochloric acid, hydrogen iodide, hydrogen bromide, and bromides and iodides of non-lead heavy metals such as ferrous iodide, and the like, can be employed.

The condensation product is preferably cooled, and any excess acetone removed by conventional means. Optionally, the product can be washed with alkali and/or water to remove catalysts and residues. Optionally, the product can be dried.

The particular process and techniques utilized for forming the diphenylamine-acetone reaction product is within the level of the skill of the ordinary artisan. U.S. Pats. 2,562,802; 1,975,167; 1,915,108 and 1,807,355 represent such knowledge.

As is known, the reaction product can contain from about 0 to 25 wt. percent diphenylamine.

The reaction product of acetone and diphenylamine is employed in an amount to heat stabilize the polyurethane composition. Generally from about 0.05 to 2 wt. percent is employed, based on the weight of the total polyurethane formulation. Preferably, an amount in the range of 0.2 to 0.5 wt. percent is employed.

The heat stabilizer of this invention can be incorporated into the polyurethane using conventional techniques, the primary desired result being an intimate mixture of the stabilizer with the polyurethane components. Advantageously, the stabilizer can be incorporated by premixing with the polyether polyol prior to employing the polyol in polyurethane production. The stabilizer can, however, be incorporated with the other materials employed in preparing the polyurethane product, such as, for example, as a slurry or solution in a silicone surfactant, and the like.

Further, as heretofore mentioned, the polyether polyols, as herein defined, are employed in predominant amounts to provide polyurethane compositions. Such polyether polyols will therefore be employed in amounts such that they comprise at least 50 wt. percent of all polyols used in formulating the polyurethane composition. Predominant polyols will therefore consist of polyether polyols that have an equivalent weight in the range of 300 to 2,500 and have at least one and preferably a plurality of ether linkages and contain at least two hydroxy groups per molecule. Preferably the polyether polyols have a functionality in the range of about 2 to 8. Mixtures of such polyether polyols can be employed. Except for conventionally employed diol and polyol chain extenders, or cross-linkers, it is preferred that essentially all polyols used in formulating the polyurethane composition be the polyether polyol of this invention, as defined hereinabove.

Exemplary of the preferred polyether polyols are polyoxyalkylene polyols prepared from the oxyalkylation of di-, tri-, tetra-, or higher polyhydric aliphatic alcohols containing from about 2 to 12 carbon atoms and containing 2 to 8 hydroxy groups. Such alkylene oxide adducts of the polyhydric alcohols can be representatively depicted as follows:

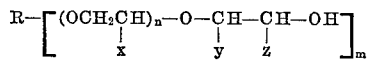

wherein R is the nucleus, i.e., the residue, of an oxyalkylation susceptible aliphatic polyhydric alcohol that contains 2 to 12 carbon atoms and contains 2 to 8 hydroxyl groups, $z$ is an alkyl group containing 1 to 18 carbon atoms, $x$ and $y$ independently are hydrogen or $z$, $n$ has an average value of 0 to 50 and $m$ is an integer of 2 to 8 corresponding to the number of hydroxyl groups originally present in the polyhydric alcohol.

Such polyether polyols are obtained by reacting alkylene oxides under conventional oxyalkylation conditions with a suitable initiator, i.e., with the polyhydric aliphatic alcohol. U.S. Pats. 3,000,963 and 3,535,307 describe such conventional processes. Of course, sufficient alkylene oxide is employed to provide polyether polyols having an equivalent weight in the range of about 300 to about 2,500.

Such polyether polyols can be prepared from mixtures of alkylene oxides and/or mixtures of polyhydric aliphatic alcohols. Likewise, the polyether polyols can contain random addition, block addition or random and block addition.

The following polyhydric alcohols are representative initiators: ethylene glycol; propylene glycol; butane diols; glycerine; trimethylolpropane; trimethylolethane; hexane triols; pentaerythritol; 4-methyl glucoside; pentane diols; diethylene glycol; dipropylene glycol; xylitol; inositol; sorbitol; mannitol; sucrose; glucose, and the like. Also included as suitable aliphatic polyhydric alcohol initiators for use with alkylene oxides include aminoalcohols containing from about 2 to 12 carbon atoms and 2 to 8 hydroxyl groups.

The preparation of exemplary amino polyols is described in U.S. Pats. 3,331,791; 3,364,239; 3,335,186; and 3,110,732. Alcohols such as ethanolamine; diethanolamine; triethanolamine; tributanolamine; triisopropanolamine; 2-(2-aminoethyl)ethanol; 2-amino, 2-(hydroxymethyl)-1,3 propane diol; and the like, are exemplary aminoalcohol initiators.

The alkylene oxides which can be reacted with polyhydric initiators can be represented by the following formula:

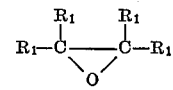

wherein, $R_1$ is hydrogen, alkyl, cycloalkyl, haloalkyl, alkoxyalkyl, or monoaryl groups, containing 1 to 18 carbon atoms per $R_1$ radical.

Preferably, alkylene oxides are employed corresponding to the following formula wherein $R_2$ represents hydrogen, a $C_1$ to $C_{18}$ alkyl, an aryl, such as phenol, a $C_1$ to $C_4$ haloalkyl, or mixtures thereof.

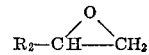

Most preferably, the oxylakylating agent contains from 2 to 4 carbon atoms per molecule. Ethylene oxide, propylene oxide, butene-1 oxide, dodecene-1 oxide, octadecene-1 oxide, epichlorohydrin, and the like, are representative alkylene oxides.

Subject to the equivalent weight limitations herein, other classes of polyols which can be employed are the alkylene oxide adducts of the amine compounds such as ethylenediamine, diethylenetriamine, triethyltetramine, and the like, and modified polyols such as phosphorus-containing polyols such as representatively described in U.S. Pats. 3,400,085 and 3,324,202 represent suitable polyether polyols.

As hereinbefore indicated, any suitable isocyanate containing not less than two isocyanate groups per molecule can be employed. Accordingly, polyisocyanates having two, three, or more, reactive isocyanato groups per molecule can be utilized. Examples of such isocyanates are: toluene diisocyanates, such as the 2,4- and 2,6-isomers; and mixtures, and the like; methylene bis(phenyl) isocyanates, such as the 2,2'-, 2,4'- and 4,4'-isomers which can be employed alone or as admixtures, and mixtures thereof with toluene diisocyanates, and the like. 1,5-naphthylene diisocyanate, phenyl diisocyanate, toluidine, diisocyanate, hexylmethylene diisocyanate, octadecyl diisocyanate, tetramethylene diisocyanate, methylene bis(cyclohexyl) isocyanates, such as 2,2'-, 2,4'- or 4,4'-isomers and mixtures thereof, and the like, are further representative isocyanates. Mixtures of diisocyanates and polymeric isocyanates can be employed. Exemplary mixtures are described in U.S. Pat. 3,362,979. Typical of the isocyanates generally used in preparation of polyurethane foams include toluene diisocyanates, crude toluene diisocyanates, polyphenylmethyl polyisocyanates, and the like Diphenylmethane diisocyanates, and various aliphatic isocyanates or any of the above-mentioned isocyanates can be suitably employed in the preparation of the elastomers. As previously indicated, quasi-prepolymers of the above isocyanates with polyols can also be utilized. Likewise, various modified isocyanate materials such as those containing various modifying agents such as the aromatic diamines, substituted anilines, glycols, and the like, such as described in U.S. Pats. 3,462,470; 3,394,165; 3,644,457; and 3,394,164 may in some applications be desired. Generally, the isocyanate is employed in an amount to provide in the range of 0.95 to about 1.35 NCO groups per hydroxyl group employed.

As previously indicated, the practitioner may wish to include in the polyurethane formulation a cross-linker or chain extender. Traditionally, a number of cross-linkers or chain extenders have been employed in semiflexible integral skin foams and elastomers. Such materials have also been used in some instances to prepare flexible foams, and the like. Conventional cross-linkers include aliphatic diols or polyols such as ethylene glycol, 1,4 - butane diol, glycerol, glycerol-alkylene oxide adducts, trimethylolpropane, trimethylolpropane-alkylene oxide adducts, pentaerythritol-alkylene oxide adducts, sorbitolalkylene oxide adducts, and the like. Amine cross-linkers commonly employed are triethanolamine, and its alkylene oxide adducts, alkylene oxie adducts of ethylenediamine, alkylene oxide adducts of diethylenetriamine, and the like. Other cross-linkers such as disclosed in U.S. Pats. 3,382,-284; 3,595,814; and 3,072,582 can be suitably employed. Alkylene oxide adducts of aniline, methylene dianiline, chlorinated methylene dianiline ad chlorinated benzidine are other representative cross-linkers. Chain extenders prepared by reacting monoalkanolamines with ethylene or propylene carbonate can also be employed.

Desirably, the polyurethane formulation will include a suitable catalyst to promote one or more of the various possible reactions. Depending upon the type of urethane desired, etc. al., the skilled artisan can select the catalytic material of choice. Triethylenediamine; N-methyl- or N-ethylmorpholine; N,N-dimethylcyclohexylamine; N,N-dimethylethanolamine; N,N'-dimethylpiperazine; trimethylamine; N,N'-bis(2-hydroxypropyl)-2-methyl piperazine; trimethylaminopiperazine, N,N,N',N' - tetramethyl - 1,3-propanediamine; tertiary polyoxyalkylene polyamines as described in U.S. Pat. 3,660,319; 2-dimethylaminoethyl-3-dimethyl-amino propyl ether; B,B'-dimorpholinodiethyl ether; ether amines described in U.S. Pat. 3,330,782; and amine catalysts described in U.S. Pats. 2,941,967; 3,645,-925; 3,661,808; and 3,313,744 are exemplary amine catalysts. Organometallic catalysts can also be used in combination with the amine catalyst or independently thereof. Organometallic compounds such as dibutyltin dilaurate; dibutyltin dioctoate; dioctyltin oxide; dimethyltin diacetate; phenylmercuric propionate; stannous octoate; and such organometallic catalysts as are described in U.S. Pats. 3,592,787; 3,419,509; 3,583,945; 3,398,106; 3,397,-158; 3,075,927; and 3,084,177 are representative.

Polyurethane formulations can include blowing agents such as in the preparation of polyurethane foams. Preferably, a small amount of surfactant is employed in conjunction with the blowing agent. The blowing agent can be any of those known to be useful for this purpose, e.g., water, halogenated hydrocarbons, hydrocarbons, and the like. Flexible and semi-flexible foams are conventionally blown with carbon dioxide from the water-isocyanate reaction or a combination of water and volatile blowing agent. The water level in such instances is generally in the range of about 1.5 to about 4.5 parts by weight based on the weight of the polyurethane formulations and the volatile blowing agent level in such instances is generally in the range of 0 to 20 parts by weight depending, of course, on the density and hardness desired. Integral skin foams are generally blown with only a volatile blowing agent. Generally an amount in the range of about 5 to about 25 parts by weight, depending upon the density desired, is employed. Gas or gas producing materials which include the lower molecular weight alkanes, alkenes, dialkyl ethers, halogenated hydrocarbons, and the like, are suitable volatile blowing agents. Monofluorotrichloromethane; difluorodichloromethane; 1,1,2-trichloro, 1,2,2-trifluoroethane; di-chlorotetrafluoroethane; methylene chloride; ethyl chloride; chloroform; and carbon tetrachloride are representative halogenated hydrocarbons. Methane, ethane, ethylene, propane, propylene, pentene, hexane, heptane, ethylether, diisopropylether, and the like, are other representative volatile blowing agents. Carbon dioxide, nitrogen, natural gas, and the like, are other typical gas blowing agents.

Silicone oils such as those described in U.S. Pats. 2,834,-748; 3,313,744; and 3,647,724 are representative surfactants that can be employed in preparing polyurethane foams. Depending on the properties and the utility desired of the polyurethane composition, various other components can be utilized. For example, various additives such as talc, mica, clay, titanium dioxide, carbon black, wood pulp, silica, barium, sulfate, calcium carbonate, dyes, asbestos, fibrous glass, synthetic fibers, and the like, can be employed in the polyurethane formulation as fillers or for other purposes. Paraffin oils, castor oil, polyvinyl chloride, and other materials have been conventionally included as well. The addition of other antioxidants or stabilizers, plasticizers, emulsifiers, wetting agents, smoke-inhibiting agents, fire retardants, and the like, can be employed as well.

It is evident that the subject polyurethane compositions which have been stabilized against dry-heat degradation in accordance with this invention have varied utilities. They can be applied as heat, sound, or crash insulating materials such as in appliances, automobiles, and the like. They also can be employed in such applications as flooring, carpet underlay, and the like. As previously indicated, the subject invention is particularly useful in preparing semi-flexible integral skin foams. U.S. Pats. 3,586,649 and 3,099,519 present exemplary descriptions concerning the conventional preparation of integral skin flexible foams. Typically, a volatile blowing agent, an isocyanate, a catalyst, and a low molecular weight chain extender having an equivalent weight in the range of about 30 to 150 are preferably included with the polyols of this invention in formulating such a polyurethane composition.

U.S. Pat. 3,467,606 represents a typical method for preparing semi-flexible foams and U.S. Pat. 3,072,582 represents a typical disclosure describing the preparation of flexible foams. Urethane elastomers and coatings can also be prepared by known techniques such as representatively described in Du Pont Bulletin PB-2 by Remington and Lorenz entitled "The Chemistry of Urethane Coatings" and The Upjohn Company Technical Bulletin-402, by Rausch, D'Ancicco and Sayigh entitled "Isonate® 143L in the Preparation of Urethane Elastomers" (1966).

The aforecited references and patents are hereby incorporated herein by reference thereto.

Illustrative of the foregoing discussion and description and not to be interpreted as a limitation on the scope thereof or on the materials therein employed, the following examples are presented. It will be evident from the following examples that the diphenylamine-acetone reaction product stabilizers of this invention have the outstanding ability to protect polyurethane compositions against heat degradation. For some unexpected reasons, the surprising superiority of the subject stabilizer over closely related compounds, such as the alkylated diphenylamines, will be evident therefrom. The polyurethane polyols described in the following examples included 600 p.p.m. of di-tertiary-butyl-para cresol which is normally included as a polyol component.

EXAMPLE I

The following polyurethane formulation was prepared and employed in the manufacture of semi-flexible integral skin polyurethane foams. The prepared samples were observed for foam appearance after storage in a forced draft oven for seven days at 215° to 220° F. These results are reported in Tables 1 and 2. Those foams suitable for application, following such testing, are indicated by a + sign. Unsuitable forms are indicated by a — sign. Runs 1 to 5 that are reported in Table 1 represent the preparation and testing of polyurethane integral skin automotive armrest. Runs 1 to 12 that are reported in Table 2 represent the preparation and testing of polyurethane integral skin foams formed in a wide-mouth quart bottle. All runs employed the following polyurethane formulation:

Polyurethane formulation, p.b.w.[a]

| | |
|---|---|
| Triol-molecular weight 6,500 [b] | 75 |
| Polymethylenepolyphenyl isocyanate | [c] 42.2 |
| Triethylenediamine [d] | 0.33 |
| Dibutyltin dilaurate | 0.2 |
| Trichloromonofluoromethane | 20 |
| Aliphatic diol chain extender | 25 |
| Stabilizer | [e] 0.3 |

[a] Parts-by-weight.
[b] About 75% of the hydroxyl groups are primary.
[c] Isocyanate Index 1.10.
[d] Used one p.b.w. of TEDA as dipropylene glycol solution (33%) (Dabco 33LV).
[e] Amount used, if any.

In Runs 1 to 5 of Table 1, the foregoing formulation was charged as two components, i.e., A component=the isocyanate, B component=the remaining components. The formulation was interjected into an aluminum mold which had been coated with release agent. The inside cavity of the mold measured approximately 10" x 2" x 3". The mold was preheated to 105° F. Sufficient materials were interjected into the mold at 15 pounds per minute to yield an overall density of approximately 15 p.c.f. The integral skin armrest was stripped from the mold in five minutes, and allowed to cure overnight. It was then placed in the forced draft oven as previously indicated.

In Runs 1 to 12, reported in Table 2, the aforementioned B component was mixed in a quart ice cream carton. The isocyanate, i.e., component A, was then added and the foaming mixture stirred for about five seconds with a 1½ inch Hy-Lift stirrer turning at 5,000 r.p.m. This mixture was then poured into a wide-mouth quart bottle coated with release agent. After five minutes the integral skin foam was removed from the bottle and allowed to cure overnight at room temperature. The foam was then placed in a forced draft oven as indicated above.

TABLE 1

| Run No. | Stabilizer | Results of dry heat aging, 215-220° F., 7 days (+ or −) | |
|---|---|---|---|
| 1 | None | The foam was mushy and badly distorted.[a] | − |
| 2 | Diphenylamine | The foam had softened noticeably. | − |
| 3 | 2,6-ditertiary-butyl-4 methylphenol. | The foam completely degraded.[b] | − |
| 4 | Diphenylamine-acetone reaction product. | No signs of softening or loss in properties. | + |
| 5 | do.[c] | do | + |

[a] Observed after only two days.
[b] Observed after only three days.
[c] This run was prepared from a formulation identical to that reported above except the 6,500 MW triol had about 50% primary hydroxyl groups and trimethylaminoethylpiperazine was substituted for the triethylenediamine. Even after 26 days at 215–220° F. storage, the foam showed no signs of softening or loss of properties. It was only slightly darker in color after such prolonged aging.

TABLE 2

| Run No. | Stabilizer | Results of dry heat aging, 215-220° F., 7 days (+ or −) | |
|---|---|---|---|
| 1 | None | The center of foam gummy, foam very soft. | − |
| 2 | 2,2'-thiobis(4-methyl-6-tertiary-butyl phenol). | Foam soft, center gummy | − |
| 3 | 2,6-di-tertiary-dodecyl-p-cresol. | Foam soft, center slightly sticky and easily torn. | − |
| 4 | 2,2'-methylenebis(4-methyl-6-tertiary-butyl phenol. | Center slightly sticky and discolored. | − |
| 5 | 4-tertiary-butyl phenol | Foam soft, center gummy | − |
| 6 | Hindered phenol[a] | Foam soft, center slightly sticky and easily torn. | − |
| 7 | Tri(mixed mono and dinonyl) phosphate. | Foam soft, center gummy | − |
| 8 | Dioctyldiphenylamine | Center discolored and apparent loss in properties. | − |
| 9 | N,N'-diphenyl-p-phenylenediamine. | Apparent loss in properties, foam darkened considerably. | − |
| 10 | Phenyl-β-naphthylamine | Center of foam soft and slightly sticky. | − |
| 11 | Aniline-butyraldehyde reaction product.[b] | Center of foam soft and sticky. | − |
| 12 | Diphenylamine-acetone reaction product.[c] | No apparent loss of properties. | + |

[a] Commercial product—high molecular weight hindered phenol.
[b] Commercial product (Antox Special).
[c] Commercial product (Naugard BG).

EXAMPLE II

In the following example, a flexible polyurethane foam was prepared using the following formulation. It was tested for heat stability as indicated below. The results of the runs using the indicated stabilizers are reported in Table 3.

Polyurethane formulation, p.b.w.

| | |
|---|---|
| 3,000 molecular weight propylene oxide adduct of glycerin | 300 |
| Silicone oil | 2.4 |
| Water | 13.2 |
| Stannous octoate | 1.2 |
| Aliphatic tertiary amine | 0.3 |
| Toluene diisocyanate | [a]161.8 |
| Stabilizer | ([b]) |

[a] Isocyanate Index 1.05.
[b] As reported in Table 3.

All of the above components, except for the toluene, diisocyanate, were stirred in a one-quart ice cream carton for one minute using a 1½ inch Hy-Lift stirrer turning at 5,000 r.p.m. The toluene diisocyanate was then added and the stirring was continued for an additional five seconds. The foaming mixture was then poured into a 12" x 12" x 6" cardboard container and allowed to rise to full height. It was then immediately placed in an oven operated at 356° to 365° F. for two hours. After cooling a 4" x 4" x ¼" section of the foam was cut from the bun and its reflectance measured using a Hunter, Model D-40 reflectometer. The percent retention of reflectance (whiteness) was determined by the formulation:

percent reflection retention=

$$\frac{\text{reflectance before heat aging} - \text{reflectance after heat aging}}{\text{reflectance before heat aging} \times 100}$$

The results are reported in Table 3.

TABLE 3

Percent reflection retention (1) None _____ 51
(2) 2,6-di-tertiary-butyl-p-cresol, 1500 p.p.m. _____ 64
(3) 2,6-di-tertiary-dodecyl-p-cresol, 2500 p.p.m. ____ 64
(4) Dilaurylthiodipropionate 1500 p.p.m.; and high M.W. hindered phenol 500 p.p.m.[a] _____ 65
(5) Diphenylamine-acetone reaction product 2500 p.p.m.[b] _____ 72

[a] As reported in footnote a, Table 2.
[b] Commercial product (Naugard A).

EXAMPLE III

The following polyurethane formulation was employed to prepare polyurethane elastomer samples for heat stability testing.

Polyurethane formulation, p.b.w.

B-component:

| | |
|---|---|
| Triol, molecular weight 6500 [a] | 820 |
| Diol, molecular weight 4000 [b] | 1,640 |
| Clay [c] | 1,357 |
| Talc [d] | 151 |
| Pigment [e] | 9.0 |
| Aliphatic diol chain extender | 66 |
| Phenylmercuric propionate | 8.19 |
| Dibutyl-p-cresol | 5.04 |

A-component: Polymethylenepolyphenyl isocyanate.

[a] Polyol same as reported in footnote c, Table 1.
[b] About 50% primary hydroxyls.
[c] Burgess No. 30.
[d] Nytal 400 talc.
[e] Burnt umber.

The elastomer B component was prepared by mixing the components of the above formulation, except the isocyanate, with heat and vacuum stripping. The elastomer sample was then prepared by mixing 100 parts by weight of the above B component with 7.6 parts by weight of the above A component under vacuum and pouring the mixture into an 8" x 8" x ⅛" aluminum mold. The elastomer sample was allowed to cure overnight at room temperature and was then removed from the mold. The sample was allowed to cure for a week at ambient conditions and was then tested for Shore $A_2$ hardness. The sample exhibited an instantaneous Shore $A_2$ hardness of 58–59. The elastomer sample was then placed in an oven for 175 hours at 180° F. The elastomer sample was tacky after this heat treatment and the instantaneous Shore $A_2$ hardness had dropped to 41.

A second elastomer was prepared as above, except that 0.32 p.p.h. of diphenylamine-acetone reaction product was added to the above-described B component formulation. As in the former elastomer sample, the sample was allowed to cure at amibent conditions for a week and was then tested for Shore $A_2$ hardness. The sample containing the subject stabilizer exhibited an instantaneous Shore $A_2$ hardness of 59–60. After heat aging in an oven for 175 hours at 180° F. the sample was not tacky and still exhibited an instantaneous Shore $A_2$ hardness of 59–60. It is evident that the subject elastomeric composition was effectively stabilized against dry-heat degradation.

EXAMPLE IV

A conventional polyurethane foam was prepared from the following formulation in a manner as previously described using a polyol having an equivalent weight of 115, a polyisocyanate (PAPI, Isocyanate Index 1.05), a fluorocarbon, and a silicone oil. The addition of the subject diphenylamine-acetone reaction product to this formulation did not noticeably improve scorch resistance of the polyurethane foam prepared therefrom over the same foam prepared without the subject stabilizer. This example demonstrates that the subject diphenylamine-acetone reaction product is not effective in inhibiting heat degradation in polyether polyurethane foams when not employed in accordance with our invention.

The preceding Examples I to III are typically representative of our invention. Of course, such examples can be repeated with similar success by substituting the generically and specifically described reactants and conditions described herein for those employed in the recited examples. As will be evident to those skilled in the art, various modifications of this invention can be made or followed in light of the discussion and disclosure herein set forth, without departing from the spirit or the scope thereof.

We claim:

1. A polyurethane composition stabilized against dry heat degradation comprising
   (a) a polyurethane composition formed by reacting an organic isocyanate containing at least two isocyanate groups per molecule with a polyol which predominantly comprises a polyether polyol having an equivalent weight in the range of about 300 to 2,500,
   (b) a stabilizing amount of diphenylamine-acetone reaction product.

2. The composition of claim 1 wherein said diphenylamine-acetone reaction product comprises about 0.05 to 2 wt. percent of said polyurethane composition.

3. The composition of claim 2 wherein said diphenylamine-acetone reaction product comprises about 0.2 to 0.5 wt. percent of said polyurethane composition.

4. The composition of claim 2 wherein said organic isocyanate comprises toluene diisocyanates, polymethylenepolyphenyl isocyanates, or admixtures thereof.

5. The composition of claim 2 wherein the heat stabilized polyurethane composition is an integral skin polyurethane foam.

References Cited

UNITED STATES PATENTS

| | | | |
|---|---|---|---|
| 1,807,355 | 5/1931 | Terhorst | 260—800 |
| 2,562,802 | 7/1951 | Mankowich et al. | 260—45.9 R |
| 3,003,995 | 10/1961 | Schule et al. | 260—45.8 N |
| 3,335,110 | 8/1967 | Mino et al. | 260—45.9 R |
| 2,915,496 | 12/1959 | Swart et al. | 260—2.5 BB |

DONALD E. CZAJA, Primary Examiner

G. R. MARSHALL, Assistant Examiner

U.S. Cl. X.R.

260—2.5 AZ, 45.9 R, 77.5 SS

UNITED STATES PATENT OFFICE
CERTIFICATE OF CORRECTION

Patent No. 3,798,184            Dated March 19, 1974

Michael Cuscurida
and
Doris Marvin Rice
Assignors to Jefferson Chemical Company, Inc.
Houston, Texas, a corporation of Delaware It is certified that errors appear in the above-identified patent and that said Letters Patent are hereby corrected as shown below:

In column 4, line 58, "triethyltetramine" should read -- triethylenetetramine --; column 4, line 73, the "," should be deleted between "toluidine" and "diisocyanate". In column 5, line 8, after "like" should appear -- . --; column 5, line 35, "oxie" should read -- oxide --; column 5, line 47, "etc. al." should read -- et. al. --; column 5, line 50, "trimethyl-" should read -- triethyl- --; column 5, line 52, "," following "trimethylaminopiperazine" should read -- ; --. In column 9, line 33, following the word "elastomer" should read -- sample --. In column 10, line 7, the first sentence of the paragraph should read -- The preceding Examples I to III are typically representative of the results achieved by following the teachings of our invention. --

Signed and sealed this 13th day of August 1974.

(SEAL)
Attest:

McCOY M. GIBSON, JR.            C. MARSHALL DANN
Attesting Officer                Commissioner of Patents